(12) United States Patent
Daniali et al.

(10) Patent No.: US 11,790,048 B2
(45) Date of Patent: Oct. 17, 2023

(54) EXTENDED REALITY (XR) ACCESSIBILITY CONTROLLER

(71) Applicant: T-Mobile USA, Inc., Bellevue, WA (US)

(72) Inventors: Ali Daniali, Lynnwood, WA (US); Christopher De La Garza, Seattle, WA (US); Hossam Basiony, Kenmore, WA (US); Brian Garcia, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 124 days.

(21) Appl. No.: 17/391,802

(22) Filed: Aug. 2, 2021

(65) Prior Publication Data

US 2022/0038845 A1 Feb. 3, 2022

Related U.S. Application Data

(60) Provisional application No. 63/059,874, filed on Jul. 31, 2020.

(51) Int. Cl.
*H04W 36/00* (2009.01)
*G06F 18/25* (2023.01)
*G06F 3/16* (2006.01)

(52) U.S. Cl.
CPC ............ *G06F 18/251* (2023.01); *G06F 3/167* (2013.01)

(58) Field of Classification Search
CPC .... G06F 18/251; G06F 18/253; G06F 18/254; G06F 18/256; G06F 3/167
See application file for complete search history.

(56) References Cited

U.S. PATENT DOCUMENTS

| | | | |
|---|---|---|---|
| 10,636,063 B1* | 4/2020 | Kalaboukis | G06V 20/20 |
| 11,238,526 B1* | 2/2022 | Le chevalier | G06F 16/9535 |
| 2014/0081634 A1* | 3/2014 | Forutanpour | G06F 40/58 704/235 |
| 2018/0101550 A1* | 4/2018 | Calcaterra | G06N 5/022 |
| 2018/0261012 A1* | 9/2018 | Mullins | H04L 67/535 |
| 2021/0294967 A1* | 9/2021 | Goodsitt | G06F 21/42 |
| 2021/0319452 A1* | 10/2021 | Ramanathan | G06Q 20/3272 |

* cited by examiner

*Primary Examiner* — Moustapha Diaby
(74) *Attorney, Agent, or Firm* — Han Santos, PLLC

(57) ABSTRACT

This disclosure describes techniques that enable service providers to unobtrusively assist impaired individuals while communicating and transacting in a physical environment. An extended reality (XR) accessibility controller is described that is configured to capture, from an XR device, sensor data associated with an object at a geographic location, identify the object, and generate object data for delivery to the XR device.

20 Claims, 7 Drawing Sheets

EXTENDED REALITY (XR) ACCESSIBILITY CONTROLLER

RELATED APPLICATION

This application claims priority to a commonly owned U.S. Provisional Patent Application No. 63/059,874, filed on Jul. 31, 2020, titled "Spatially Aware Autonomous Self-Service Bot in Extended Reality (XR)," which is herein incorporated by reference in its entirety.

BACKGROUND

Computing devices enable users to explore and immerse themselves in extended reality (XR) environments, such as augmented reality environments that provide a real-time view of a physical real-world environment that is merged with or augmented by computer-generated graphical content.

A significant portion of the population is visually impaired or hearing imparted. Navigation through unfamiliar environments can be challenging for people with visual and hearing impairments. Various attempts have been made to utilize technology to provide additional assistance from simple devices such as ultrasonic canes (e.g., visual impairment) to hearing aids (e.g., hearing impairment). However, many attempts to utilize technology fails to provide a substitution pathway for using another sensory organ to assist an individual in dealing with their impairment. A substitution pathway may comprise providing real-time audible assistance to a visually impaired individual in an unfamiliar physical environment or providing real-time visual assistance to a hearing-impaired individual in an unfamiliar physical environment.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
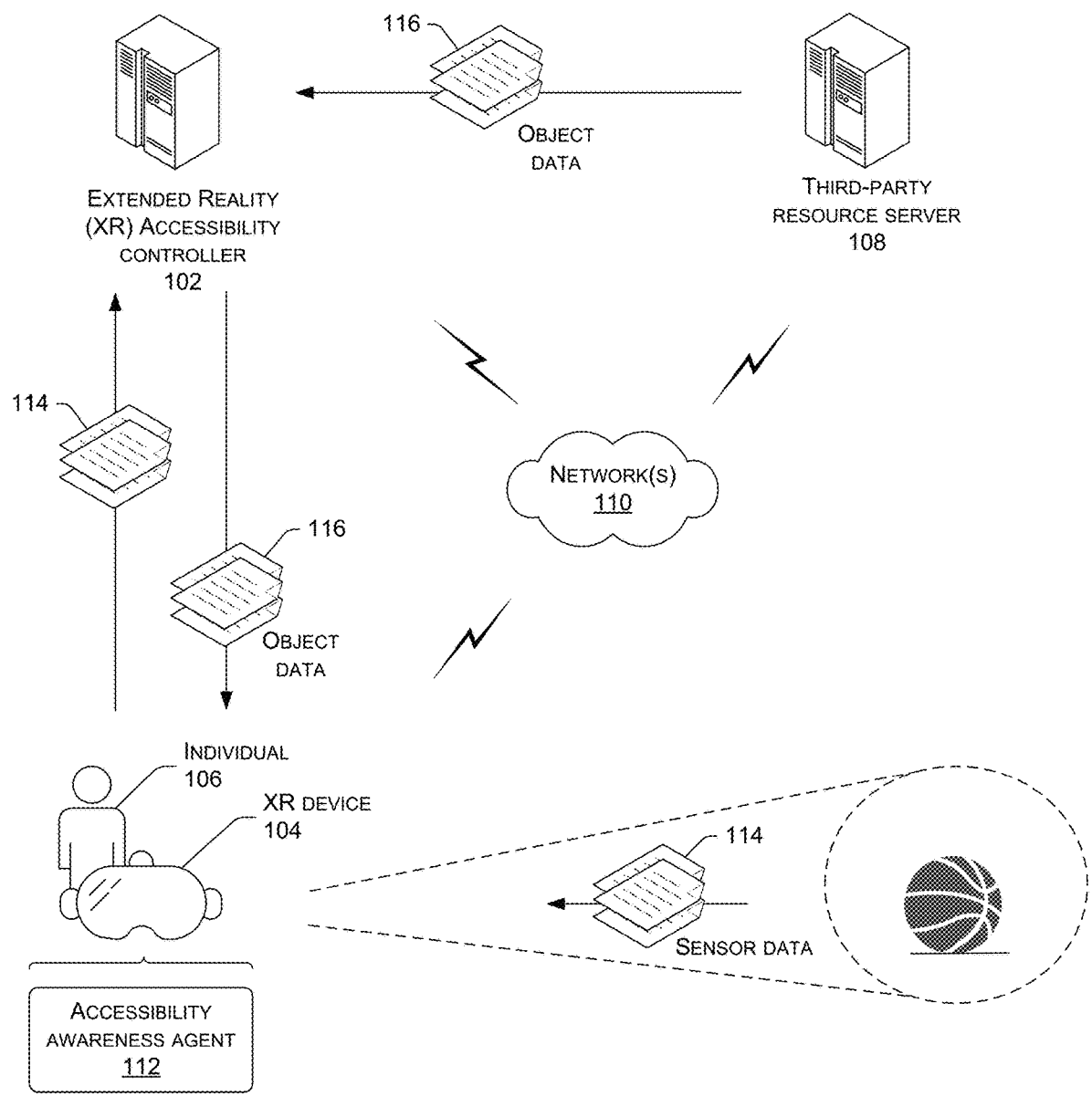
FIG. 1 illustrates a schematic view of an exemplary computing environment for the operation of the XR accessibility controller.

This disclosure describes techniques that enable service providers to unobtrusively assist impaired individuals while communicating and transacting in a physical environment. Accessibility issues, such as hearing impairments and visual impairments, can create obstacles that impact how affected individuals obtain the right level of support in a physical environment. An individual with a hearing impairment may struggle to interact with a salesperson at a physical merchant store, or an individual with a visual impairment may struggle to find particular products or service offerings within a physical merchant store. This disclosure describes an extended reality (XR) accessibility controller that is configured to unobtrusively bridge the communication gap for impaired individuals while they interact in a physical environment. When immersed in an XR environment, an individual may experience a tenuous link to the real-world environment that includes virtual information. The provisioning of virtual information in the XR environment may enhance the individual's ability to interact with and explore the real-world environment.

In various embodiments, the XR accessibility controller may capture sensor data from an Extended Reality (XR) device worn by an impaired individual. The sensor data may comprise audio data or image data (collectively "audiovisual sensor data"), or digital marker data of the surrounding physical environment. Further, the XR device may comprise a pair of eyeglasses or goggles that track the field of view (e.g., direct line-of-sight and peripheral view) of the impaired individual. In this way, the XR device may capture sensor data of the physical environment that is related to the impaired individual's line of sight.

In one embodiment, the XR accessibility controller may employ one or more machine-learning algorithms to identify an object based on sensor data. The sensor data may comprise audio data, visual data, or a suitable combination of both (e.g., audiovisual data). The object may comprise an individual, an inanimate object (e.g., product), or a physical representation of a service offering (e.g., an advertisement displayed within the physical environment describing a service offering). The XR accessibility controller may compare the sensor data to registered templates associated with the physical environment, and in doing so, infer an identity of the object based on the similarity of sensor data to the registered templates.

Registered templates may comprise biometric templates of individuals and visual or audible templates of product or service offerings associated with the physical geographic location. Registered templates may be maintained by the XR accessibility controller may be updated regularly to improve correlation accuracy with sensor data. Regarding individuals, the registered templates may comprise voice biometric templates and visual biometric templates. Voice biometric templates may account for vocal accent, tonality, refraction of sound, vocal frequency, vocal pitch, or any suitable combination thereof. Visual biometric templates may account for facial features, gait, posture, body shape, or any suitable combination thereof.

In another embodiment, the XR accessibility controller may identify an object based on digital marker data. The XR device may detect a digital marker that is proximate to an object, and in doing so, infer an identity of the object based on reading the digital marker. A digital marker comprises an encoding that can provide an identifier and/or attribute to another device (e.g., XR accessibility controller) when queried over a communication interface. Example digital markers include radio frequency (RF) tags, barcodes, Quick Response (QR) code, near-field communication (NFC) devices, infrared (IR) markers (e.g., Internet-of-Things [IoT] devices), and active RF devices (e.g., IoT devices).

Once an object has been identified, the XR accessibility controller may generate object data for delivery to the XR device. The object data may comprise object information that describes the object. For example, object information for a product offering may include a product name, price, and current availability. Similarly, object information for a salesperson may include the individual's name, title, and sales specialty (e.g., product specialty, service specialty, etc.).

In one embodiment, the XR accessibility controller may retrieve the object information from a data repository, based at least in part on the geographic location. The geographic location of the XR device may be used to identify the physical merchant store, and further, retrieve the object information from a data repository associated with the geographic location. The data repository may reside locally at the physical merchant store or may reside on a remote, third-party server.

Further, the XR accessibility controller may generate object data for delivery to the AR, based at least in part on the objection information. The object data may comprise virtual objects (e.g., audible attributes, visual attributes, or a suitable combination of both) that are intended to provide targeted assistance to impaired individuals, based on a disclosed impairment and how impaired individuals choose to interact with the physical environment. In this way, the wearer of the XR device may be presented with an augmented view of the real world that includes a real-world representation of a physical environment that is overlayed with virtual objects.

The object data may include computer-executable instructions that are configured to augment a virtual representation of the object information onto a real-world view of the physical environment as viewed through the XR device. In one embodiment, the object data may comprise an audible attribute of the object that is configured to assist individuals with a visual impairment. For an object that corresponds to a product offering, the audible attribute may recite product features, such as a product name, cost, and availability. The audible attribute may be based on object information gleaned from a data repository or text information that is physically displayed with the product offering, itself. Additionally, for an object that corresponds to an individual, the audible attribute may recite the name, title, and specialty of the individual.

Moreover, the object data may comprise an audible attribute that amplifies audio data captured by the XR device. For example, an individual with a hearing impairment may seek to have audio data amplified to a predetermined decibel threshold. In this instance, the XR accessibility controller may analyze audio data (e.g., sensor data) received from the XR device, to determine a sound intensity. If the sound intensity is less than the predetermined decibel threshold, the XR accessibility controller may create an audible attribute (e.g., object data) that is an amplification of the audio data to at least the predetermined decibel threshold.

In another embodiment, the object data may comprise a visual attribute of the object that is configured to assist individuals with a hearing impairment. The object data may be configured to augment the visual attribute onto a viewing screen of the XR device, such as the visual attribute is overlayed adjacent to a real-world representation of the object (e.g., product offering or individual), when the object is within a field-of-view of the XR device. The visual information may comprise text information that is associated with the object. For an object that comprises a product offering, the text information may include a product name, cost, and availability. The audible attribute may be based on object information gleaned from a data repository or text information that is physically displayed with the product offering, itself. Additionally, for an object that corresponds to an individual, the text information may include the name, title, and specialty of the individual.

The text information may also include a transcript of the conversation between one individual and another individual. In one example, the XR accessibility controller may detect a visual presence of multiple people (e.g., objects) within a field of view of the XR device. In doing so, the XR accessibility controller may generate a spatial vector to confirm a source of audio data as being one of the individuals in conversation. Additionally, or alternatively, the XR accessibility controller may analyze the audio data to infer an identity of the speaker (e.g., based on an analysis using vocal biometric templates), and further analyze visual biometric data of the individuals (e.g., as captured from the field of view of the XR device) to infer an identity of the speaker (e.g., based on analysis using visual biometric templates). In doing so, the XR accessibility controller may match the audio data to an individual based on an analysis of matching vocal and visual biometric data.

Once the audio data has been matched to an individual, the XR accessibility controller may generate object data that presents text information (e.g., transcript of the audio data spoken by the individual) within a callout bubble that is positioned near a real-world representation of the individual, as viewed through the XR device.

The XR accessibility controller may identify an object and/or generate object data based on an interaction with an electronic device at the physical geographic location. In one embodiment, the XR device may broadcast, via a short-range communication protocol, electronic handshake data (e.g., data signal) to detect the presence of electronic devices at a physical geographic location.

In response to the broadcast, the XR device may capture and relay electronic handshake responses as sensor data, to the XR accessibility controller. The XR accessibility controller may interrogate each electronic handshake response to identify a trusted electronic device at the physical geographic location. In doing so, the XR accessibility controller may retrieve, from, a trusted electronic device, relevant, object information that can be used to identify an object, generate object data, or a suitable combination of both. An electronic device may be identified as a trusted device by comparing its device identifier to a list of registered device identifiers maintained by the XR accessibility controller.

In one example, the XR accessibility controller may establish the communication connection directly with a trusted electronic device and independent of the XR device following receipt of the electronic handshake responses. In another example, the XR accessibility controller may rely on the XR device to establish the communication connection with the trusted electronic device, whereby the XR device acts as a communication gateway for the XR accessibility controller to interact with the trusted electronic device.

Moreover, the trust electronic device may correspond to the object, for which object information or object data is sought. In another example, the trusted electronic device and the object may be different. In this latter case, identifying the object may be based on the object and the trusted electronic device being co-located at the physical geographic location.

In some embodiments, the XR accessibility controller may retrieve, from a data repository, context data associated with the physical geographic location. The context data may describe the usage and purpose of the physical geographic location. For example, a geographic location may functionally accommodate a market for goods and services during set times of the day and days of the week. At other times of the day or days of the week, the same geographic location may serve a different purpose, such as a venue for public or private events. Similarly, another geographic location may serve as a merchant store during set times, and a venue for public or private events during other times.

Here, the XR accessibility controller may analyze the context data relative to the geographic location of the XR device (e.g., sensor data) and the time of data and day of the week, to infer a location context. The location context may correspond to one of a merchant store, a public or private establishment, or a public or private event. The XR accessibility controller may identify a data repository that holds object information about the geographic location, based at least in part on the location context. From the data repository, the XR accessibility controller may retrieve object information that can be used to identify objects at the geographic location, generate object data associated with objects at the geographic location, or a suitable combination of both.

Further, the term "techniques," as used herein, may refer to system(s), method(s), computer-readable instruction(s), module(s), algorithms, hardware logic, and/or operation(s) as permitted by the context described above and through the document.

FIG. 1 illustrates a schematic view of an exemplary computing environment for the operation of the XR accessibility controller. The exemplary computing environment 100 may correspond to a physical environment within which an XR accessibility controller 102 is configured to provide unobtrusive assistance to impaired individuals. The physical environment may correspond to a retail store, a public venue, or a private venue. In these examples, the XR accessibility controller 102 may be configured to detect and analyze objects within the physical environment and assist with object information presented via an XR device 104 worn by an impaired individual 106.

The XR accessibility controller 102 may be configured to interact with an XR device 104 and a third-party resource server(s) 108 via one or more network(s) 110. The XR device 104 comprises an electronic device that intercepts a real-world through one or more sensors and displays the real-world view onto its viewing display with an augmented view that includes one or more virtual objects. The virtual objects may comprise computer-generated perceptual information, sometimes across multiple sensory modalities, including visual and auditory modalities. The augmented view may comprise an overlay of virtual objects on a representation of a real-world view, as seen through the viewing display of the XR device 104. In some examples, the XR device 104 may include a subscriber identity module (SIM), such as an eSIM, to identify each device to a telecommunication service provider (also referred to herein, as "telecommunications network").

The XR device 104 may include an accessibility awareness agent 112 that is configured to interact with the XR accessibility controller 102. The accessibility awareness agent 112 may capture sensor data 114 of the surrounding physical environment, via sensors that reside on the XR device 104. Further, the accessibility awareness agent 112 may communicate the sensor data 114 to the XR accessibility controller 102. In response, the accessibility awareness agent 112 may receive object data 116 from the XR accessibility controller 102. Object data 116 may comprise virtual objects (e.g., audible attributes, visual attributes, or a suitable combination of both) that are intended to provide targeted assistance to impaired individuals, based on a disclosed impairment and how impaired individuals choose to interact with the physical environment. For example, individuals with a hearing impairment may be presented with an amplified audio attribute of audio data that is broadcast (e.g., conversations and/or other spoken words) within the physical environment. Additionally, or alternatively, object data may comprise a visual attribute that transcribes audio data (e.g., conversations and other spoken words) to text, and further augments the text onto a viewing screen of the XR device.

The third-party resource server(s) 108 may provide the XR accessibility controller 102 with various data, including context data, device identifiers for a trusted electronic device, and object information associated with a physical environment, and registered templates associated with objects within a physical environment. Context data may describe the usage and purpose of a physical geographic location. For example, the same physical environment may serve different purposes (e.g., location contexts), such as a merchant store, or a venue for public or private events. Context data may provide context as to the use and purpose of a physical environment based on the time of day and day of the week. Object information may describe an object detected by the XR device. Registered templates may be used to identify objects based on visual and audible characteristics. Registered templates may be used to identify inanimate objects and individuals (e.g., voice biometric templates and visual biometric templates). Device identifiers for trusted devices may be used by the XR accessibility controller 102 to identify the trusted electronic device, to access context data or object information associated with a physical environment.

The XR accessibility controller 102 may operate on one or more distributed computing resource(s). The one or more distributed computing resource(s) may include one or more attendee device(s) that operate in a cluster or other configuration to share resources, balance load, increase performance, provide fail-over support or redundancy, or for other purposes. The one or more attendee device(s) may include one or more interfaces to enable communications with other networked devices, such as the scheduler device 118 via the one or more network(s) 110.

The one or more network(s) 110 may include public networks such as the Internet, private networks such as an institutional and/or personal intranet, or some combination of a private and public network(s). The one or more network(s) can also include any suitable type of wired and/or wireless network, including but not limited to local area network (LANs), wide area network(s) (WANs), satellite networks, cable networks, Wi-Fi networks, Wi-Max networks, mobile communications networks (e.g., 5G-NR, LTE, 3G, 2G), or any suitable combination thereof.

Figure 2:
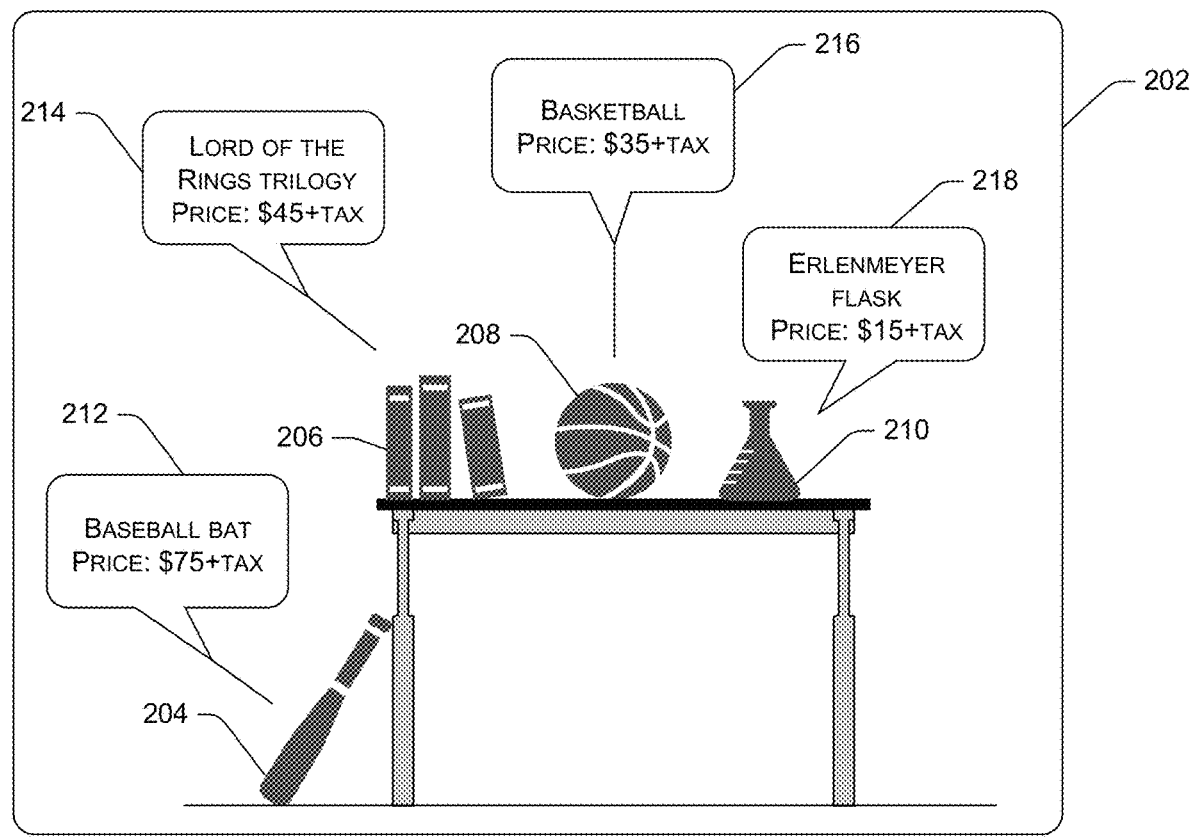
FIG. 2 illustrates an exemplary viewing screen of an XR device that overlays virtual objects adjacent to real-world representations of inanimate objects.
Figure 2:
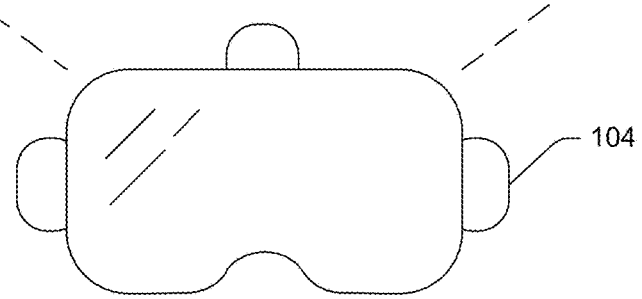

FIG. 2 illustrates an exemplary viewing screen of an XR device that overlays virtual objects adjacent to real-world representations of inanimate objects. In the illustrated example, the viewing screen 202 of the XR device 104 presents a real-world representation of a collection of inanimate objects, namely a baseball bat 204, a book set 206, a basketball 208, and an Erlenmeyer flask 210. Within the viewing screen 202, the XR device 104 overlays visual attributes within callout bubbles that depict object information about each of the inanimate objects. Each callout bubble is positioned adjacent to the real-world representation of the inanimate object to which it describes. For example, callout bubble 212 (e.g., baseball bat, price $75+tax) provides object information for the baseball bat 204, callout bubble 214 (e.g., Lord of the Rings Trilogy, price $45+tax) provides object information about the book set 206, callout bubble 216 (e.g., basketball, price $35+tax) provides object information about the basketball 208, and callout bubble 218 (e.g., Erlenmeyer flask, price $15+tax) provides object information about the Erlenmeyer flask 210.

Figure 3:
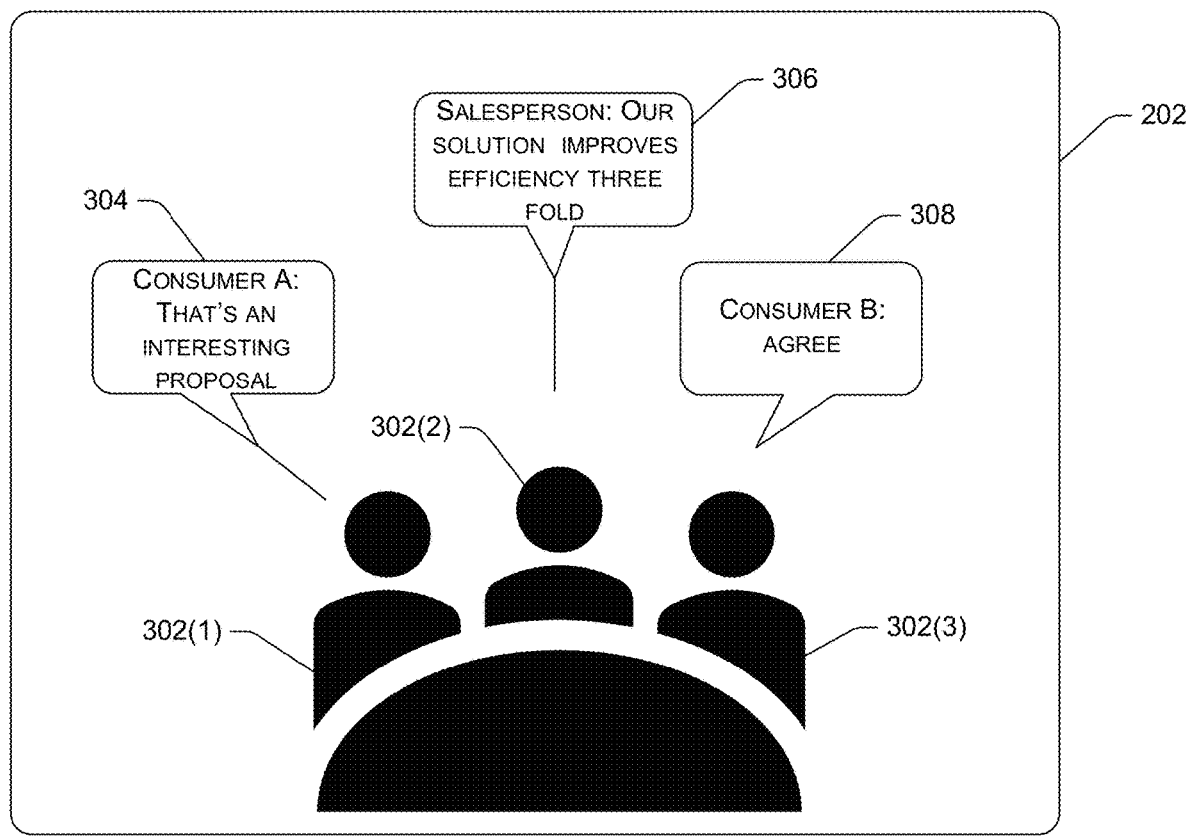
FIG. 3 illustrates an exemplary viewing screen of an XR device that overlays virtual conversation bubbles adjacent to real-world representations of individuals in conversation.
Figure 3:
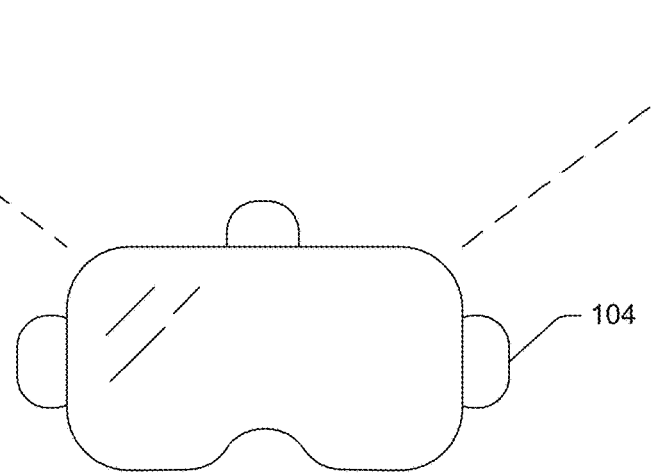

FIG. 3 illustrates an exemplary viewing screen of an XR device that overlays virtual conversation bubbles adjacent to real-world representations of individuals in conversation. In the illustrated example, the viewing screen 202 of the XR device 104 presents a real-world representation of individual(s) 302(1)-302(3) engaged in conversation. Within the viewing screen 202, the XR device 104 overlays visual attributes within callout bubbles that depict object information about each of the individual(s) 302(1)-302(3). The object information includes the transcribed text of each individual's engaged conversation with the other individuals. Each callout bubble is positioned adjacent to the individual who is responsible for the spoken word. For example, the callout bubble 304 (e.g., consumer A: that's an interesting proposal) is positioned adjacent to the speaker of those words, namely individual 302(1), Similarly, callout bubble 306 (e.g., salesperson: our solution improves efficiency threefold) is positioned adjacent to individual 302(2), and callout bubble 308 (e.g., consumer B: I agree) is positioned adjacent to individual 302(3).

Figure 4:
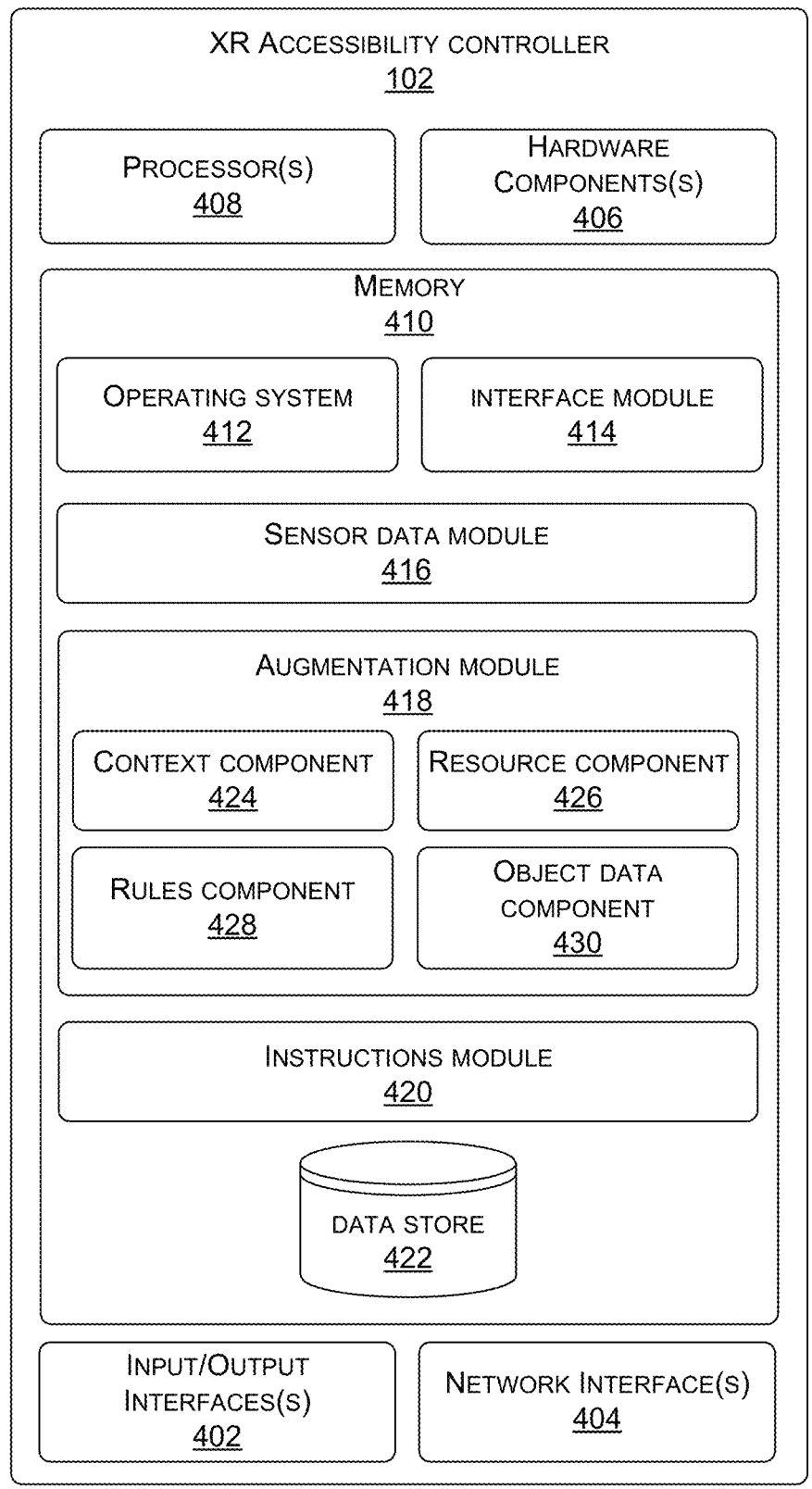
FIG. 4 illustrates various components of an example XR accessibility controller.

FIG. 4 illustrates various components of an example XR accessibility controller. The XR accessibility controller 102 may be configured to interact with an extended reality (XR) device worn by an impaired individual to unobtrusively assist the impaired individual while communicating and transacting in a physical environment. To assist an individual with a hearing impairment, the XR accessibility controller 102 may augment a visual attribute (e.g., a conversation transcript or object label) associated with an object, onto a viewing screen of the XR device. The visual object may be configured to overlay a real-world representation of the object, as viewed on the viewing screen. Similarly, to assist an individual with a visual impairment, the XR accessibility controller 102 may present an audio attribute (e.g., recitation of object information) associated with the object, via the XR device.

The XR accessibility controller 102 may include input/output interface(s) 402. The input/output interface(s) 402 may include any suitable type of output interface known in the art, such as a display (e.g., a liquid crystal display), speakers, a vibrating mechanism, or a tactile feedback mechanism. Input/output interface(s) 402 also includes ports for one or more peripheral devices, such as headphones, peripheral speakers, or a peripheral display. Further, the input/output interface(s) 402 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the XR accessibility controller 102 may include network interface(s) 404. The network interface(s) 404 may include any suitable sort of transceiver known in the art. For example, the network interface(s) 404 may include a radio transceiver that performs the function of transmitting and receiving radio frequency communications via an antenna. Also, the network interface(s) 404 may include a wireless communication transceiver and a near-field antenna for communicating over unlicensed wireless Internet Protocol (IP) networks, such as local wireless data networks and personal area networks (e.g., Bluetooth or near field communication (NFC) networks). Further, the network interface(s) 404 may include wired communication components, such as an Ethernet port or a Universal Serial Bus (USB). Hardware component(s) 406 may include additional hardware interface, data communication hardware, and data storage hardware.

Further, the XR accessibility controller 102 may include one or more processor(s) 408 that are operably connected to memory 410. In at least one example, the one or more processor(s) 408 may be a central processing unit(s) (CPU), graphics processing unit(s) (GPU), or both a CPU and GPU or any suitable sort of processing unit(s). Each of the one or more processor(s) 408 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 408 may also be responsible for executing all computer applications stored in the memory, which can be associated with common types of volatile (RAM) and/or non-volatile (ROM) memory.

In some examples, memory 410 may include system memory, which may be volatile (such as RAM), non-volatile (such as ROM, flash memory, etc.), or some combination of the two. The memory may also include additional data storage devices (removable and/or non-removable) such as, for example, magnetic disks, optical disks, or tape.

The memory 410 may further include non-transitory computer-readable media, such as volatile and nonvolatile, removable and non-removable media implemented in any suitable method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any suitable non-transitory medium which can be used to store the desired information.

In the illustrated example, the memory 410 may include an operating system 412, an interface module 414, sensor data module 416, an augmentation module 418, an instructions module 420, and a data store 422. The operating system 412 may be any suitable operating system capable of managing computer hardware and software resources. The operating system 412 may include an interface layer that enables applications to interface with the input/output interface(s) 402 and the network interface(s) 404.

The interface module 414 may be configured to interact with third-party resource server(s), XR device(s), and other electronic devices associated with a physical environment. The interface module 414 may interact with the third-party resource server(s) to request and receive, object information and registered templates associated with objects within a physical environment. The object may be an inanimate object (e.g., a wine glass or a sports ball) or an individual (e.g., a salesperson) associated with a physical environment. Third-party resource servers may also provide context data for the XR accessibility controller to determine a location context associated with the physical environment. Also, third-party resource servers may provide a list of device identifiers for trusted electronic devices associated with a physical environment.

Additionally, or alternatively, the interface module 414 may also interact with trusted electronic devices associated with a physical environment to retrieve object information and registered templates associated with objects within the physical environment. In some examples, the trusted electronic device may also provide context data associated with the physical environment.

The interface module 414 may interact with an accessibility awareness agent of an XR device. The interface module 414 may retrieve, via the accessibility awareness agent, sensor data captured by the XR device. The sensor data may be associated with a surrounding physical environment, within which the XR device operates. The interface module 414 may further retrieve, via the accessibility awareness agent, an impairment identifier, if any, that is associated with the individual wearing the XR device. The impairment identifier may then be used by the augmentation module 418 to tailor a presentation of object data to the XR device, to assist the impaired individual.

The interface module 414 may further transmit, to the accessibility awareness agent, object data that is to be presented via the XR device. The object data may be virtual objects (e.g., audible attributes, visual attributes, or a suitable combination of both).

The sensor data module 416 may employ one or more machine learning algorithms to identify an object based on sensor data received from an XR device. The sensor data may comprise audio data, visual data, or a suitable combination of both. The sensor data module 416 may rely on registered object templates to identify an object. Registered templates may provide baseline visual and audible profiles of objects that can be used as a basis for comparison when identifying an object. For example, the sensor data module 416 may detect an object based on visual sensor data, and in doing so, identify the object based on a correlation to a registered template. The registered templates may comprise biometric templates of individuals and visual or audio templates of product or service offerings associated with a physical environment.

The sensor data module 416 may further identify an object based on digital marker data. Sensor data may include a digital marker that acts to identify an object based on its digital signature. Example digital markers include radio frequency (RF) tags, barcodes, Quick Response (QR) code, near-field communication (NFC) devices, infrared (IR) markers (e.g., Internet-of-Things [IoT] devices), and active RF devices (e.g., IoT devices).

The sensor data module 416 may further identify a trusted electronic device based on electronic handshake responses received from an XR device. The electronic handshake responses may comprise device identifiers of electronic devices detected within a physical environment. In this example, the sensor data module 416 may compare the detected device identifiers to known device identifiers of trusted electronic devices within the physical environment.

The augmentation module 418 may further include a context component 424, a resource component 426, a rules component 428, and an object data component 430. The context component 424 may infer a location context associated with a physical environment. Location context may relate to the purpose of a physical environment on a given day of the week and at a time of day. For example, based on the geographic location, the time of day, and the day of the week, the same physical environment may serve different purposes (e.g., location contexts), such as a merchant store, or a venue for public or private events. Accordingly, different inferences may be drawn regarding a detected object, based on the location context of the physical environment. For example, the same individual (e.g., object) may be identified as a "salesperson" within a marketplace context, and a "concert-goer" at a venue for a public event. Accordingly, the context component 424 may analyze the context data provided via a third-party resource server or trusted electronic device, to determine the location context of the physical environment.

The context component 424 may relay the inferred location context to the resource component 426 to capture the object information. The resource component 426, based on the location context, may identify a resource for object information associated with the physical environment. The resource may comprise a third-party resource server, a trusted device, or a data store 422 associated with the XR accessibility controller 102. In any case, the resource component 426 may interact with the interface module 414 to retrieve the object information.

The rules component 428 may be configured to select a virtual object type for presentation based on an impairment identifier associated with an individual wearing the XR device. For example, if the XR accessibility controller 102 is interacting with an individual with a hearing impairment, the rules component 428 may indicate to the object data component 430 to generate a visual attribute, rather than an audible attribute. In some examples, however, the impairment identifier may indicate a deterioration in hearing, in which case, the rules component 428 may also indicate to the object data component 430 to generate an audible attribute that amplifies the audio sensor data within the physical environment.

The object data component 430 may be configured to generate object data for delivery to the XR device. The object data may comprise object information that describes the object. For example, object information for a product may comprise a product name, price, and current availability. Object information for a salesperson may comprise the individual's name, title, and sales specialty.

The object data may comprise visual attributes and audible attributes, or a suitable combination of both. Selection of visual and/or audible attributes may be based on an indication received from the rules component 428. An audible attribute may amplify audio data captured by an XR device or recite object information associated with an object captured within the field of view of the XR device. A visual attribute may comprise text information associated with an object. For an inanimate object, text information may comprise a product name, cost, and availability. For an individual, text information may comprise the individual's name, title, and specialty. Text information may also comprise a conversation transcript between individuals within the field of view of the XR device. In this example, the object data component 430 may employ one or more machine-learning algorithms to generate the conversation transcript from audio data (e.g., sensor data) captured from the XR device.

The object data component 430 may be configured to overlay the text information to a position adjacent to a real-world representation of an object when the object is within a field of view of the XR device. For individuals in conversation, the object data component 430 may analyze employ one or more machine-learning algorithms to generate a spatial vector to confirm a source of audio data as being one of the individuals in conversation. In doing so, the object data component 430 may generate object data that overlays the transcript of conversation spoken by the individual to a position adjacent to a real-world representation of the individual, when the individual is within a field-of-view of the XR device.

Additionally, or alternatively, the object data component 430 may analyze the audio data to infer an identity of the speaker using registered templates associated with the speaker. For individuals, registered templates may comprise voice biometric templates and visual biometric templates. Voice biometric templates may account for vocal accent, tonality, refraction of sound, vocal frequency, vocal pitch, or any suitable combination thereof. Visual biometric templates may account for facial features, gait, posture, body shape, or any suitable combination thereof.

The instructions module 420 may be configured to generate computer-executable instructions for delivery to the XR device. The computer-executable instructions may cause the XR device to dynamically present the object data onto the XR device. Visual attributes may be temporally overlayed to a position adjacent to an appropriate object within a field of view of the XR device. Audible attributes may be broadcast via a speaker of the XR device.

The data store 422 may include suitable data that is pertinent to an operation of the XR accessibility controller 102. By way of example, the data store 422 may include registered templates for inanimate objects (e.g., visual and audio profiles), registered biometric templates for individuals (e.g., voice biometric template or visual biometric templates), historical context data associated with a physical environment, historical object data, historical object information, and historical training data used to train the one or more machine-learning algorithms.

Also, the XR accessibility controller 102, via various modules and components, may make use of one or more trained machine-learning algorithms such as supervised learning, unsupervised learning, semi-supervised learning, naive Bayes, Bayesian network, decision trees, neural networks, fuzzy logic models, and/or probabilistic classification models.

Figure 5:
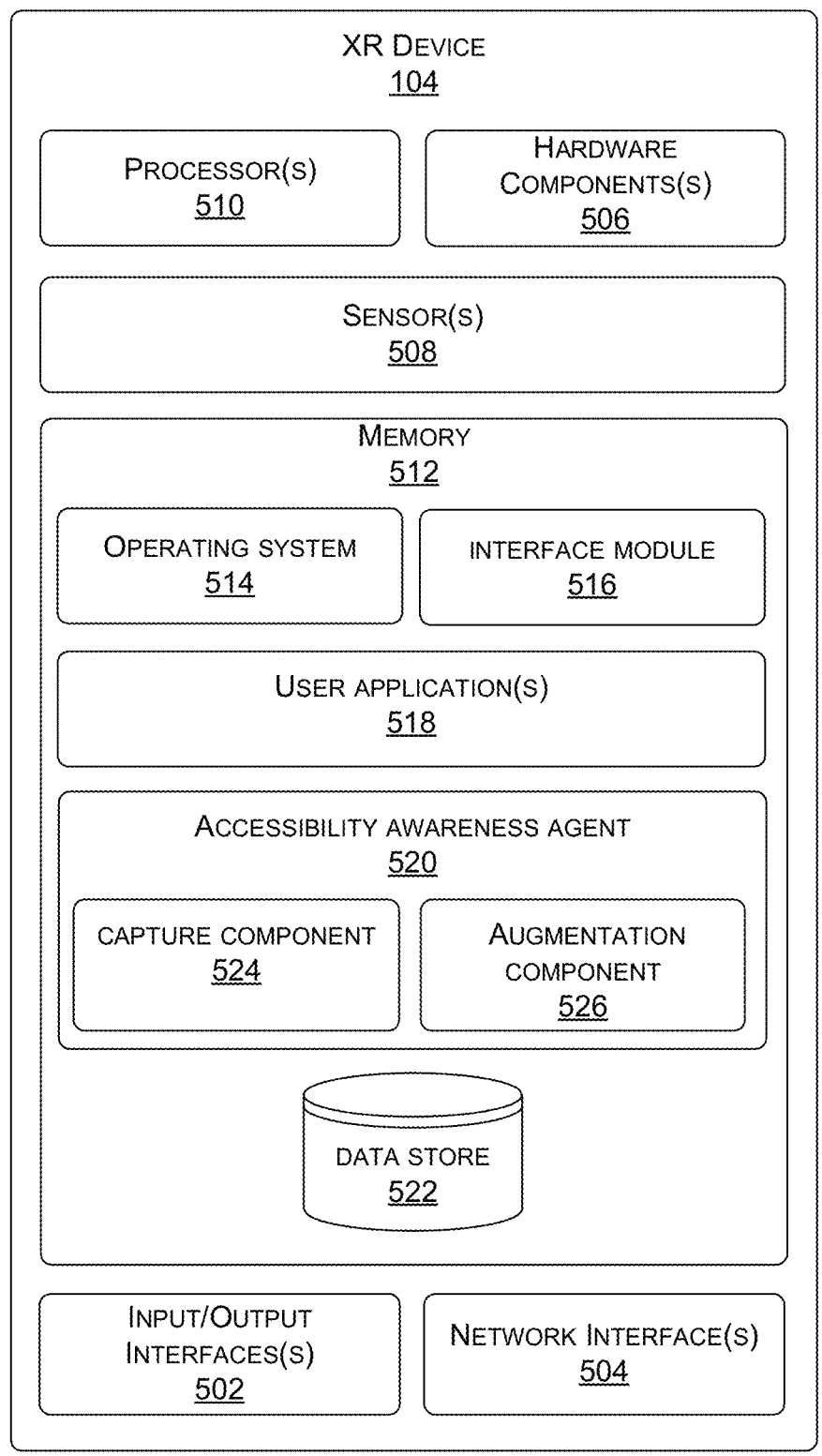
FIG. 5 illustrates various components of an example XR device.

FIG. 5 illustrates various components of an example XR device. The XR device 104 may comprise a pair of eyeglasses or goggles that track the field-of-view (e.g., direct line-of-sight and peripheral view of an individual wearer. When worn by an impaired individual, the XR device 104, in combination with the XR accessibility controller 102 may unobtrusively assist the impaired individual while communicating and transacting in a physical environment.

The XR device 104 may include input/output interface(s) 502 and network interface(s) 504. The input/output interface(s) 502 may be similar to input/output interface(s) 402, and the network interface(s) 504 may be similar to network interface(s) 404. Hardware component(s) 506 may include additional hardware interface, data communication hardware, and data storage hardware.

The XR device 104 may include sensor(s) 508 that capture visual data (e.g., image data and video data) and audio data of a surrounding physical environment. Sensor(s) 508 may include but are not limited to, a video capture sensor (e.g., camera), an image capture sensor (e.g., camera), an audio capture sensor (e.g., microphone), and a Global Positioning Service (GPS) sensor. Sensor(s) 508 may further leverage network interface(s) 504 that are configured to initiate electronic handshakes with electronic devices (e.g., to identify a trusted electronic device). Here, the network interface(s) 504 may capture digital marker data of the surrounding physical environment. Example digital markers include radio frequency (RF) tags, barcodes, Quick Response (QR) code, near-field communication (NFC) devices, infrared (IR) markers (e.g., Internet-of-Things [IoT] devices), and active RF devices (e.g., IoT devices).

The XR device 104 may include one or more processor(s) 510 that are operably connected to memory 512. The one or more processor(s) 510 may be similar to the one or more processor(s) 408, and the memory 512 may be similar to the memory 410.

The memory 512 may include an operating system 514, an interface module 516, user application(s) 518, an accessibility awareness agent 520, and a data store 522. The operating system 514 may be any suitable operating system capable of managing computer hardware and software resources. The operating system 514 may include an interface layer that enables applications to interface with the input/output interface(s) 502 and the network interface(s) 504.

The interface module 516 may be configured to interact with the XR accessibility controller 102 to transmit sensor data and an impairment identifier. The sensor data may include audio data and visual data of a surrounding physical environment. Sensor data may also include a digital marker that acts to identify an object based on its digital signature. The impairment identifier may identify a type of impairment (e.g., visual impairment or hearing impairment) associated with the wearer of the XR device 104. In doing so, the type of impairment may then be used by the XR accessibility controller 102 to tailor a presentation of object data that can assist the impaired individual to navigate the physical environment.

The interface module 516 may receive from the XR accessibility controller 102 object data for presentation via the XR device 104. The object data may include computer-executable instructions that present visual attributes, audible attributes, or a suitable combination of both, via the XR device 104.

User application(s) 518 may comprise executable applications that can be accessed via the XR device 104. User application(s) 518 may comprise proprietary applications native to the XR device 104 or third-party application(s) that are compatible with the XR device 104.

The accessibility awareness agent 520 may further include a capture component 524 and an augmentation component 526. The capture component 524 may be configured to interact with the sensor(s) 508 to capture sensor data from the surrounding physical environment. The capture component 524 may further capture, via a data store 522 an impairment identifier that is associated with a wearer of the XR device 104. The augmentation component 526 may be configured to execute the object data for presentation via the XR device 104.

The data store 522 may include suitable data that is pertinent to an operation of the XR accessibility controller 102. By way of example, the data store 522 may include historical sensor data, impairment identifiers, and historical instances of object data executed on the XR device.

Figure 6:
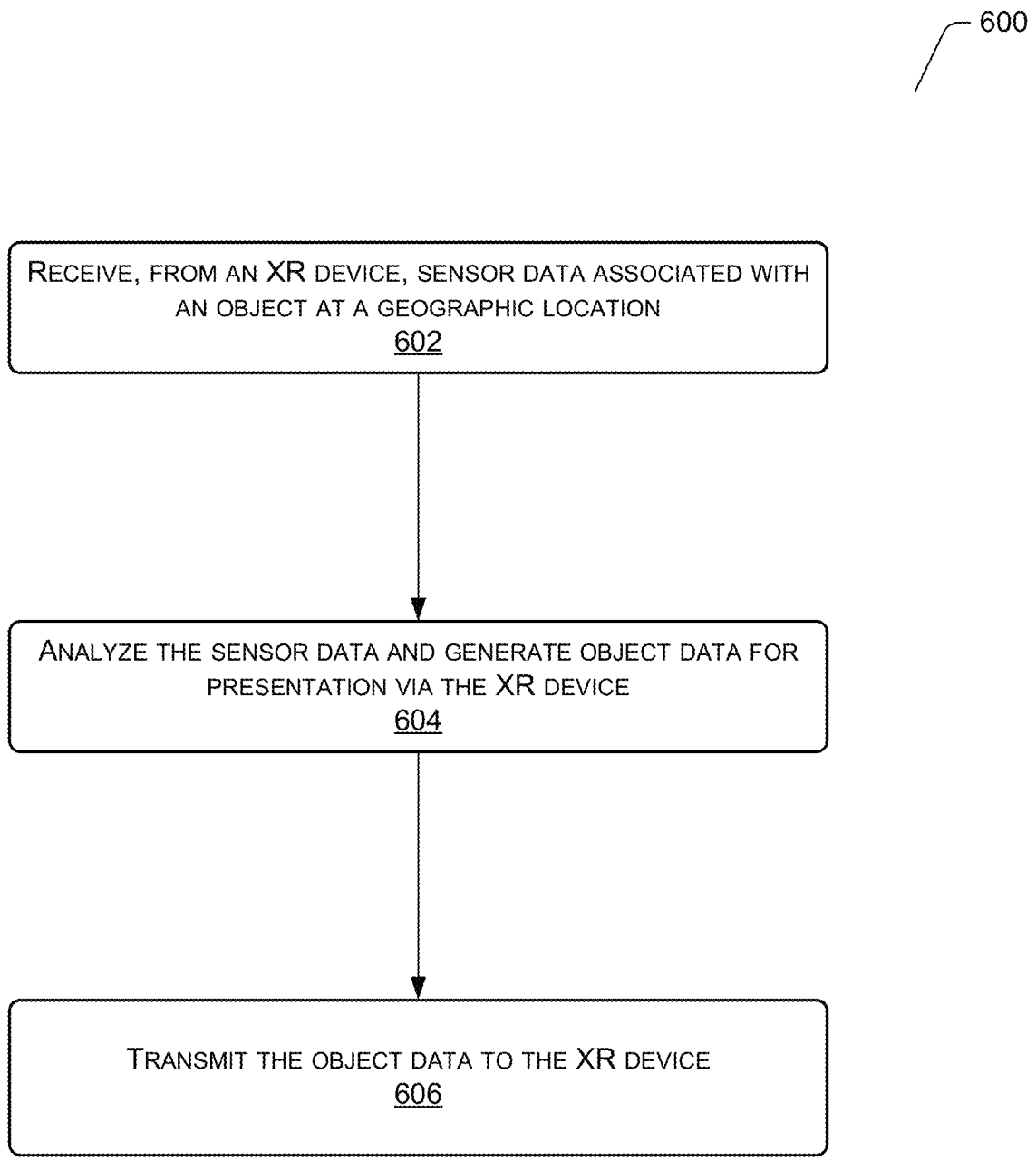
FIG. 6 illustrates an exemplary process for generating object data for presentation on an XR device.
Figure 7:
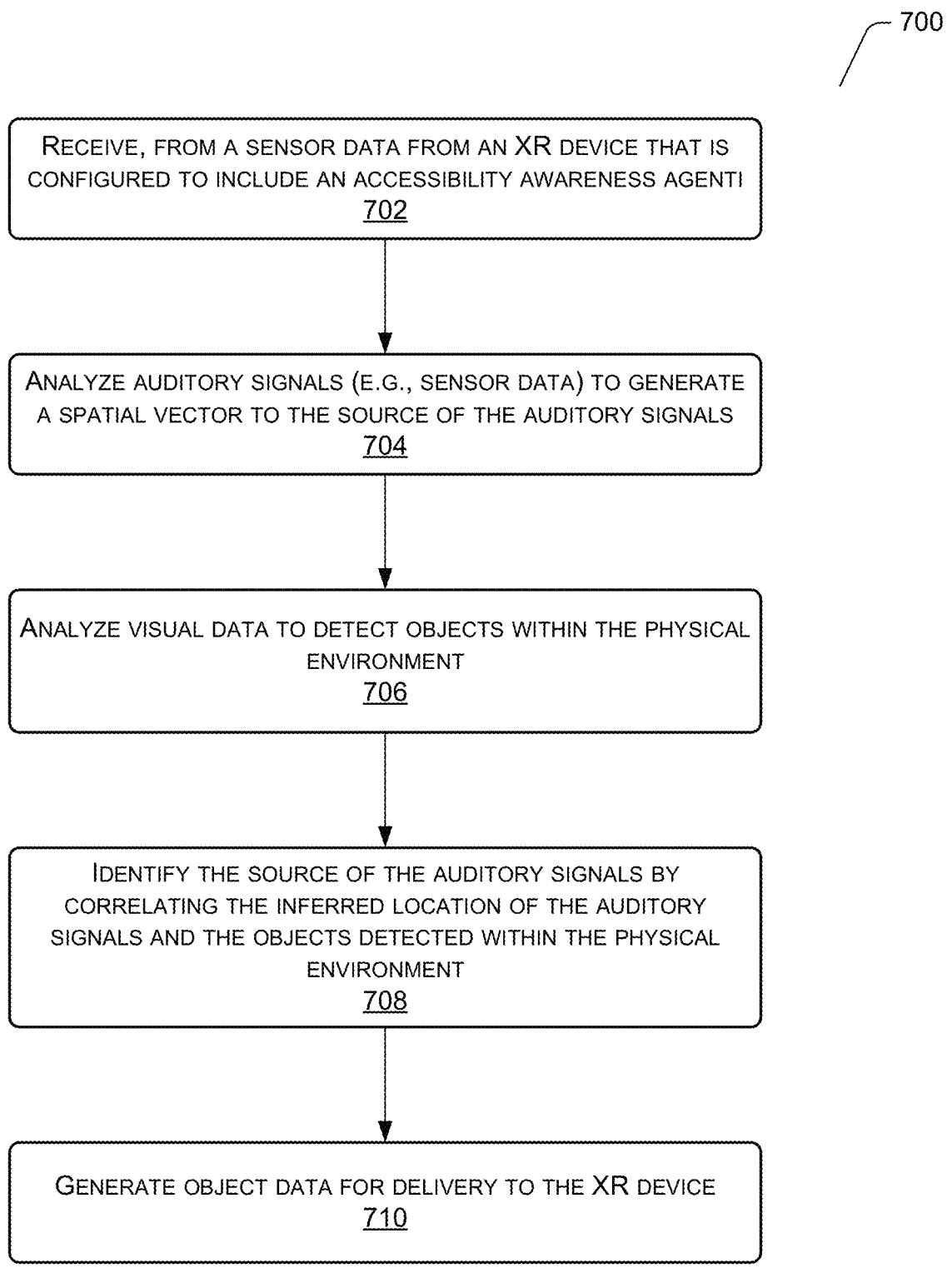
FIG. 7 illustrates an exemplary process for presenting a visual attribute that describes a conversation between individuals, on an XR device.

FIGS. 6 and 7 present processes 600 and 700 that relate to operations of the XR accessibility controller 102. Each of processes 600 and 700 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600 and 700 are described with reference to the computing environment 100 of FIG. 1.

FIG. 6 illustrates an exemplary process for generating object data for presentation on an XR device. The object data may comprise object information that describes an object. Object data may comprise virtual objects (e.g., audible attributes, visual attributes, or a suitable combination of both) that are intended to provide targeted assistance to impaired individuals while they interact within a physical environment. Process 600 is presented from the perspective of the XR accessibility controller.

At 602, the XR accessibility controller may receive sensor data from an XR device that is associated with an object at a geographic location. The sensor data may comprise audio data, visual data (e.g., image data, video data, or both), and digital marker data. A digital marker may act to identify an object based on its digital signature. Examples of digital marker data include radio frequency (RF) tags, barcodes, Quick Response (QR) code, near-field communication (NFC) devices, infrared (IR) markers (e.g., Internet-of-Things [IoT] devices), and active RF devices (e.g., IoT devices).

At 604, the XR accessibility controller may analyze the sensor data and generate object data for presentation via the XR device. The object data may be tailored to assist an impaired individual to navigate the physical environment. For example, consider an individual with a hearing impairment. The object data may be configured to amplify audio data to a predetermined sound intensity. Alternatively, or additionally, the object data may be configured to transcribe audio data to text for presentation on a viewing screen of the XR device.

At 606, the XR accessibility controller may transmit the object data to the XR device. The object data may interact with an accessibility awareness agent that resides on the XR device. In doing so, the accessibility awareness agent may be configured to present the visual attribute and/or audible attribute associated with the object data via the XR device. Visual attributes may be overlayed onto the viewing screen of the XR device. Audible attributes may be broadcast through a speaker or headphone unit of the XR device.

FIG. 7 illustrates an exemplary process for presenting a visual attribute that describes a conversation between individuals, on an XR device. Process 700 is described from the perspective of the XR accessibility controller.

At 702, the XR accessibility controller may receive sensor data from an XR device that is configured to include an accessibility awareness agent. The sensor data may include auditory signals from at least two auditory sensors on the XR device and visual data of the surrounding physical environment. The visual data may be based on the field of view of the XR device.

At 704, the XR accessibility controller may analyze the auditory signals (e.g., sensor data) to generate a spatial vector to the source of the auditory signals. By capturing auditory signals from at least two auditory sensors on the XR device, the XR accessibility controller can employ one or more machine-learning algorithms that can infer the location of the auditory signals.

At 706, the XR accessibility controller may employ one or more machine-learning algorithms to analyze visual data (e.g., sensor data) to detect objects within the physical environment. Objects may comprise inanimate objects and individuals.

At 708, the XR accessibility controller may identify the source of the auditory signals by correlating the inferred location of the auditory signals with the objects detected within the physical environment. In one embodiment, the XR accessibility controller may detect, via the sensor data, movement of the XR device, which is indicative of the wearer moving in a particular direction or turning his or her head. The XR accessibility controller may further correlate changes in the visual data (e.g., based on movements of the wearer) with corresponding changes in the auditory signals, as detected by the XR device. In other words, a movement of the XR device (e.g., based on the wearer's motion) is likely to cause a reciprocal change in the signal strength of auditory signals captured by the XR device. Correlating changes in visual data with changes in the reciprocal signal strength of auditory signals may infer assist the XR accessibility controller in inferring the source of the auditory signals.

At 710, the XR accessibility controller may generate object data for delivery to the XR device. The object data may be configured to overlay a visual attribute adjacent to a visual representation of the source of the auditory signals. For an inanimate object that is broadcasting an auditory signal, the visual attribute may comprise a product name, price, availability, and a transcript of the auditory signals. For an individual, the visual attribute may comprise a transcript of the auditory signals. The transcript of the auditory signals may be represented as text within a callout bubble, with the callout bubble pointing to the individual (e.g., source of the auditory signal).

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A system, comprising:
one or more sensors;
one or more processors;
memory coupled to the one or more processors, the memory including one or more modules that are executable by the one or more processors to:
capture, from an extended reality (XR) device, sensor data associated with an object at a geographic location, the sensor data including electronic handshake data received via communication interaction with an electronic device at the geographical location;
identify the object, based at least in part on the sensor data;
establish a communication connection with the electronic device based at least in part on the electronic handshake data;
retrieve, from the electronic device and via the communication connection, object information associated with the object;
generate object data for delivery to the XR device, based at least in part on identifying the object and the object information associated with the object; and
transmit the object data to the XR device.

2. The system of claim 1, wherein the one or more modules are further executable by the one or more processors to:
retrieve, from a data repository, object information associated with the object based at least in part on the sensor data, the object information comprising registered templates of objects at the geographic location, and
wherein, to identify the object is based at least in part on the object information.

3. The system of claim 1, wherein the object corresponds to an individual, and wherein the one or more modules are further executable by the one or more processors to:
retrieve, from a data repository, a set of registered biometric templates of individuals associated with the geographic location;
capture, via the one or more sensors, real-time biometric data associated with the individual at the geographic location, the real-time biometric data comprising at least one of audible data or image data; and
identify the individual based at least in part on a correlation of the real-time biometric data and the set of registered biometric templates.

4. The system of claim 1, wherein the object comprises an individual and the object data comprises a visual attribute, the visual attribute corresponding to a transcript of discourse spoken by the individual, and wherein the object data further comprises computer-executable instructions that overlay the visual attribute to a position near a viewable representation of the object as viewed through the XR device.

5. The system of claim 1, wherein the sensor data comprises text information, and wherein the object data corresponds to an audible recitation of the text information, and
wherein, the object data further comprises computer-executable instructions that present the object data to a wearer of the XR device via a speaker of the XR device.

6. The system of claim 1, wherein the object is a first object, and wherein the sensor data comprises audio data, and wherein the one or more modules are further executable by the one or more processors to:
detect a visual presence of a second object adjacent to the first object as viewed through the XR device; and
generate a spatial vector to confirm a source of the audio data as being the first object, based at least in part on the sensor data, and
wherein to generate the object data further comprises presenting text information associated with the audio data within a callout bubble that is positioned near a real-world representation of the first object as viewed through the XR device.

7. The system of claim 1, wherein the one or more modules are further executable by the one or more processors to:
retrieve, from a data repository, context data associated with the geographic location; and
identify the object based at least in part on the context data, and
wherein to generate the object data is further based at least in part on identifying the object and the context data.

8. The system of claim 1, wherein the object and the electronic device are different.

9. The system of claim 1, wherein the one or more modules are further executable by the one or more processors to:
retrieve, from a data repository, a set of registered device identifiers of computing devices associated with the geographic location;
broadcast, via a short-range communication protocol, a data signal to detect a presence of the computing devices, based at least in part on the set of registered device identifiers;
detect the presence of at least one computing device of the computing devices, based at least in part on receipt of an acknowledgement signal; and
identify the object at the geographic location based at least in part on the at least one computing device.

10. A computer-implemented method, comprising:
under control of one or more processors:
capturing, via an extended reality (XR) device, sensor data associated with a geographic location;
retrieving, from a data repository, context data associated with the geographic location;
identifying an individual at the geographic location based at least in part on the context data and the sensor data;
generating object data associated with the individual; and
transmitting the object data to the XR device for presentation to a wearer of the XR device.

11. The computer-implemented method of claim 10, further comprising:
determining a location context of the XR device, based at least in part on the context data, the location context being one of a merchant store or a venue for public or private events; and
retrieving, from the data repository, object information associated with the individual based at least in part on the context data, and
wherein, generating the object data is based at least in part on the object information.

12. The computer-implemented method of claim 10, further comprising:
detecting, via the XR device, audio data that is produced by a source at the geographic location, based at least in part on the sensor data; and
generating a spatial vector to the source of the audio data, and
wherein, identifying the individual is further based at least in part on the source of the audio data.

13. The computer-implemented method of claim 10, further comprising:
detecting, via the XR device, audio data that is produced by the individual;
determining a sound intensity of the audio data; and
amplifying the audio data to the sound intensity that corresponds to a predetermined decibel threshold, based at least in part on the sound intensity being less than the predetermined decibel threshold, and
wherein, generating the object data comprises creating an audible attribute that is an amplification of the audio data to at least the predetermined decibel threshold.

14. The computer-implemented method of claim 10, wherein generating the object data comprises:
generating text information that identifies the individual; and
generating computer-executable instructions that overlay the text information to a position near a viewable representation of the individual as viewed through the XR device.

15. One or more non-transitory computer-readable media collectively storing computer-executable instructions that, when executed with one or more processors, collectively cause computers to perform acts comprising:

capturing, via an extended reality (XR) device, sensor data associated with an inanimate object at a geolocation;

establishing, via a low-energy communication protocol, a communicative connection with an electronic device at the geolocation;

retrieving, from the electronic device, a data catalogue associated with a plurality of inanimate objects at the geolocation;

identifying the inanimate object, based at least in part on the sensor data and the data catalogue;

retrieving, from the data catalogue, information about the inanimate object;

generating object data that includes the information about the inanimate object for presentation via the XR device; and transmit the object data to the XR device.

16. The one or more non-transitory computer-readable media of claim 15, wherein the acts further comprise:

identifying a feature descriptor of the inanimate object, based at least in part on the sensor data, the feature descriptor comprising one of audio feature or a visual feature of the inanimate object, and wherein the object data comprises computer-executable instructions that communicate the feature descriptor to a wearer of the XR device, via the XR device.

17. The one or more non-transitory computer-readable media of claim 16, wherein generating the object data comprises generating audible data that recites the information about the inanimate object, and wherein the object data is further configured to audibly annunciate the audible data at a point-in-time when a representation of the inanimate object is viewable to a wearer of the XR device, via the XR device.

18. The one or more non-transitory computer-readable media of claim 16, wherein generating the object data comprises generating text information associated with the inanimate object, and wherein the object data is further configured to display the text information near a viewable representation of the inanimate object as viewed through a viewing screen of the XR device.

19. The one or more non-transitory computer-readable media of claim 15, wherein the inanimate object is a first object, and wherein the sensor data comprises audio data, and wherein the acts further comprise:

detecting a visual presence of a second object adjacent to the first object as viewed through the XR device; and generating a spatial vector to confirm a source of the audio data as being the first object, based at least in part on the sensor data, and wherein the generating the object data further comprises presenting text information associated with the audio data within a callout bubble that is positioned near a real-world representation of the first object as viewed through the XR device.

20. The one or more non-transitory computer-readable media of claim 15, wherein the acts further comprise:

retrieving, from a data repository, context data associated with the geolocation; and identifying the inanimate object based at least in part on the context data, and wherein the generating the object data is further based at least in part on identifying the inanimate object and the context data.

* * * * *